(12) United States Patent
Yao

(10) Patent No.: US 10,474,247 B2
(45) Date of Patent: Nov. 12, 2019

(54) ELECTRONIC DEVICES WITH TOUCH SCREEN AND OPTICAL WAVE PLATE ASSEMBLY THEREOF

(71) Applicant: CHI HSIANG OPTICS CO., LTD., Zhubei, Hsinchu County (TW)

(72) Inventor: Po Hung Yao, Hsinchu (TW)

(73) Assignee: CHI HSIANG OPTICS CO., LTD., Zhubei (TW)

( * ) Notice: Subject to any disclaimer, the term of this patent is extended or adjusted under 35 U.S.C. 154(b) by 0 days.

(21) Appl. No.: 16/000,755

(22) Filed: Jun. 5, 2018

(65) Prior Publication Data

US 2018/0356941 A1 Dec. 13, 2018

Related U.S. Application Data

(60) Provisional application No. 62/525,110, filed on Jun. 5, 2017.

(51) Int. Cl.
| | |
|---|---|
| *G06F 3/03* | (2006.01) |
| *G06F 3/0354* | (2013.01) |
| *G06F 3/038* | (2013.01) |
| *G06F 3/041* | (2006.01) |
| *G06F 3/044* | (2006.01) |
| *G02B 5/30* | (2006.01) |
| *G06F 3/042* | (2006.01) |

(Continued)

(52) U.S. Cl.
CPC ......... *G06F 3/0317* (2013.01); *G02B 5/3083* (2013.01); *G06F 3/038* (2013.01); *G06F 3/0321* (2013.01); *G06F 3/03542* (2013.01); *G06F 3/03545* (2013.01); *G06F 3/044* (2013.01); *G06F 3/0416* (2013.01); *G06F 3/0421* (2013.01); *G06F 2203/04105* (2013.01); *G06F 2203/04106* (2013.01); *G06K 9/222* (2013.01); *G06T 7/70* (2017.01); *G06T 2207/10048* (2013.01)

(58) Field of Classification Search
None
See application file for complete search history.

(56) References Cited

U.S. PATENT DOCUMENTS 3,701,122 A * 10/1972 Geusic .................. G02F 1/05
365/110
2006/0061724 A1 * 3/2006 Chen .................. G02F 1/13338
349/176

(Continued)

*Primary Examiner* — David D Davis

(57) ABSTRACT

A user input system includes an optical wave plate assembly a reading device. The optical wave plate assembly includes a phase wave plate and a phase retardation layer. The phase retardation layer is disposed on at least one surface of the phase wave plate. The phase retardation layer includes a code pattern with coordinate information. The optical wave plate assembly converts incident light into at least one of a first polarized light having a first polarization state and a second polarized light having a second polarization state through the phase retardation layer. The first polarization state and the second polarization state are different. The reading device is operated on the optical wave plate assembly for sensing presence or absence of the first polarized light, analyzing a distribution of a change in brightness of the code pattern, and performing a decoding to obtain the coordinate information.

18 Claims, 5 Drawing Sheets

(51) Int. Cl.
*G06K 9/22* (2006.01)
*G06T 7/70* (2017.01)

(56) References Cited

U.S. PATENT DOCUMENTS

| | | | |
|---|---|---|---|
| 2009/0002580 A1* | 1/2009 | Matsushima | G02F 1/13338 349/12 |
| 2010/0283764 A1* | 11/2010 | Miyazaki | G06F 3/03542 345/175 |
| 2012/0249490 A1* | 10/2012 | Lee | G06F 3/03542 345/179 |
| 2013/0027356 A1* | 1/2013 | Nishida | G06F 3/042 345/175 |
| 2013/0343032 A1* | 12/2013 | Lee | G02B 5/3083 362/19 |
| 2014/0292722 A1* | 10/2014 | Hong | G06F 3/042 345/175 |
| 2014/0362054 A1* | 12/2014 | Matsuki | G06F 3/0321 345/175 |

\* cited by examiner

ELECTRONIC DEVICES WITH TOUCH SCREEN AND OPTICAL WAVE PLATE ASSEMBLY THEREOF

TECHNICAL FIELD

The present invention relates to a user input system, and more particularly to a user input system in which a reading device interacts with an electronic device and an optical wave plate assembly thereof.

BACKGROUND

In recent years, with the continuous development of technology, the functions of electronic devices have become more and more powerful, and people's dependence on electronic devices has gradually increased. In the trend that electronic devices are gradually becoming more user-friendly and functional, electronic devices with touch screens are more popular among the general public. On the capacitive touch screen, the user can perform interaction with the finger, the capacitive touch pen or the electromagnetic sensor pen. The capacitive touch pen or the electromagnetic sensor pen must electrically interact with the sensing capacitor structure on the touch component to have the function of input operation. That is, the capacitive touch pen or the electromagnetic sensor pen cannot write on the powerless or non-electric writing interface for digital recording and transmission.

SUMMARY

The present invention provides a user input system and an optical wave plate assembly that can perform digital writing and recording with a light source without being supplied with power.

The present invention provides a user input system, which includes an optical wave plate assembly and a reading device. The optical wave plate assembly includes a phase wave plate and a phase retardation layer. The phase retardation layer is disposed on at least one surface of the phase wave plate. The phase retardation layer includes a code pattern. The code pattern includes encoded information and coordinate information. The optical wave plate assembly converts an incident light into at least one of a first polarized light having a first polarization state and a second polarized light having a second polarization state through the phase retardation layer. The first polarization state and the second polarization state are different. The reading device is for acting on the optical wave plate assembly, sensing presence or absence of the first polarized light having the first polarization state, analyzing a distribution of a change in brightness of the code pattern, and performing a decoding to obtain the encoded information and coordinate information.

The present invention further provides an optical wave plate assembly for use in a user input system. The optical wave plate assembly includes a phase wave plate and a phase retardation layer. The phase retardation layer is disposed on at least one surface of the phase wave plate. The phase retardation layer includes a code pattern. The code pattern includes encoded information and coordinate information. The optical wave plate assembly converts an incident light into at least one of a first polarized light having a first polarization state and a second polarized light having a second polarization state through the phase retardation layer. The first polarization state and the second polarization state are different.

In an embodiment of the invention, the first polarization state and the second polarization state are selected from one of vertical linear polarization, horizontal linear polarization, left circular polarization, and right circular polarization.

In an embodiment of the invention, the reading device includes a polarized light selector, an image sensor and a micro-processing module. The polarized light selector is for allowing the first polarized light having the first polarization state to pass therethrough. The image sensor is for sensing presence or absence of the first polarized light to output at least one bright and dark distribution pattern image. The micro-processing module is electrically connected to the image sensor and is for analyzing the bright and dark distribution pattern image and performing a decoding to obtain the coordinate information.

In an embodiment of the invention, the reading device further includes a light source module disposed on one side of the polarized light selector. The light source module emits a light beam as the incident light.

In an embodiment of the invention, the optical wave plate assembly is disposed on a display surface of a display device, and a light emitted by the display device is used as the incident light.

In an embodiment of the invention, the phase retardation layer includes a plurality of hollow regions, and the coded pattern is formed by the hollowed regions or non-hollowed regions.

In an embodiment of the invention, the code pattern includes a plurality of pattern units. A shape of the pattern unit is a single geometric pattern or a mixture of a plurality of geometric patterns.

In an embodiment of the invention, the phase wave plate is selected from one of a half-wavelength wave plate and a quarter-wavelength wave plate, and the phase retardation layer is selected from one of a half phase retardation wave plate and a quarter phase retardation wave plate.

In an embodiment of the invention, the incident light passes through the phase wave plate to become the first polarized light, and the incident light passes through the phase wave plate and the phase retardation layer to become the second polarized light.

In an embodiment of the invention, the incident light passes through the phase wave plate and the phase retardation layer to become the first polarized light, and the incident light passes through the phase wave plate to become the second polarized light.

In the embodiment of the present invention, by performing coordinate pattern coding on the phase retardation layer, the light passing through or reflected by the optical wave plate assembly can be converted into a polarized light of two polarization states according to the phase retardation layer. The reading device selects and allows the light of one of the polarization states to enter therein, and therefore generating a bright and dark distribution pattern image with high contrast caused by the presence or absence of entered polarized light. As the reading device continues to input on the optical wave plate assembly, the code pattern of the bright and dark distribution pattern image is continuously decoded, thereby obtaining representative coordinate information changes, and obtaining the planar coordinate information required for performing electronic writing and touch operations.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
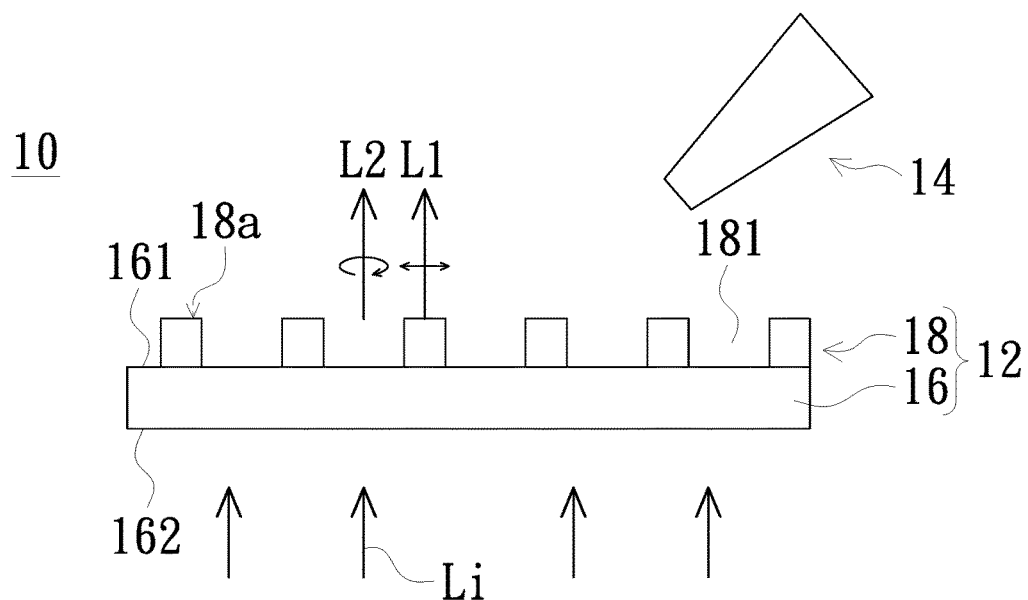
FIG. 1 is a schematic diagram of a user input system according to an embodiment of the present invention.

FIG. 1 is a schematic diagram of a user input system according to an embodiment of the present invention. As shown, the user input system 10 includes an optical wave plate assembly 12 and a reading device 14. The optical wave plate assembly 12 includes a phase wave plate 16 and a phase retardation layer 18. The phase wave plate 16 has a first surface 161 and a second surface 162 opposite to each other. The phase retardation layer 18 is disposed on one or both of the first surface 161 and the second surface 162. In the embodiment shown in FIG. 1, the phase retardation layer 18 is disposed on the first surface 161. The phase retardation layer 18 includes a code pattern 18a, and the code pattern 18a contains coordinate information. For example, the code pattern 18a may be a plurality of pattern units, and the shape of the pattern unit is a single geometric pattern or a mixture of a plurality of geometric patterns. The azimuthal distribution of the pattern units on the phase wave plate 16 is determined by a coordinate coding manner. When the incident light L1 is incident on the optical wave plate assembly 12, the optical wave plate assembly 12 converts the incident light L1 into at least one of the first polarized light L1 having the first polarization state and the second polarized light L2 having the second polarization state according to the phase retardation layer 18, wherein the first polarization state and the second polarization state are different. The reading device 14 is for acting on the optical wave plate assembly 12, such as sliding or moving. The reading device 14 senses the presence or absence of the first polarized light L1 while acting, analyzes the distribution of the change in brightness on the moving path, decodes the obtained bright and dark distribution pattern images to analyze the coordinate information of the reading device 14, thereby obtaining the movement route of the reading device 14.

In an embodiment as shown in FIG. 1, the phase retardation layer 18 includes a plurality of hollow regions 181, and the code pattern 18a is defined, for example, by a plurality of non-hollow regions (as shown in FIG. 1), but is not limited thereto. In other embodiments, the code pattern may be defined by a plurality of hollow regions 181. In an embodiment, the phase retardation layer 18 has the code pattern 18a and the hollow regions 181, and therefore, when the incident light L1 enters the optical wave plate assembly 12, the incident light L1 is respectively converted into the first polarized light L1 having the first polarization state or the second polarized light L2 having the second polarization state based on whether or not having a phase change by the phase retardation layer 18. The first polarization state is, for example, linear polarization, and the second polarization state is, for example, circular polarization. For example, if the incident light L1 passes through the phase wave plate 16 and the code pattern 18a, the incident light L1 is converted into the first polarization light L1 having the linear polarization. Alternatively, if the incident light L1 passes only through the phase wave plate 16 (and the hollow regions of the phase retardation layer 18), the incident light L1 is converted by the phase wave plate 16 into the second polarized light L2 having the circular polarization.

Figure 2:
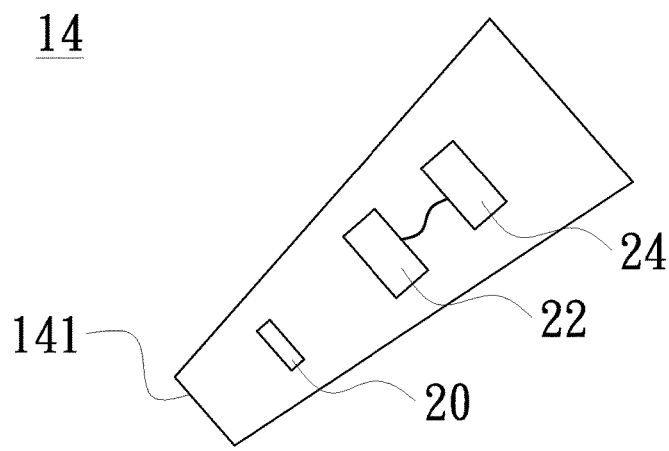
FIG. 2 is a schematic diagram of a reading device according to a first embodiment of the present invention.

Following the above description, as shown in FIG. 2, the reading device 14 includes a polarized light selector 20, an image sensor 22 and a micro-processing module 24. The polarized light selector 20 allows one of the first polarized light L1 and the second polarized light L2 to pass therethrough. In an embodiment, the polarized light selector 20 allows the first polarized light L1 having the first polarization state to pass therethrough, but is not limited thereto. In another embodiment, the polarized light selector 20 allows the second polarized light L2 having the second polarization state to pass therethrough. The image sensor 22 senses the presence or absence of the first polarized light L1 from the polarized light selector 20 to output at least one bright and dark pattern distribution pattern image, wherein the bright and dark pattern distribution pattern image is directly related to the definition of the code pattern of the phase retardation layer 18. The micro-processing module 24 is electrically connected to the image sensor 22 and is for analyzing a plurality of first images and a plurality of second images and performing a decoding process to obtain the coordinate information.

For example, when the reading device 14 acts on the optical wave plate assembly 12, the polarized light selector 20 allows the first polarized light L1 to pass therethrough and the first polarized light L1 is sensed by the image sensor 22 if the region passed by the reading device 14 has the emitted first polarized light L1; alternatively, the image sensor 22 senses no light due to the polarized light selector 20 does not allow the first polarized light L1 to pass therethrough if the region passed by the reading device 14 has the emitted second polarized light L2. Thus, as the reading device 14 continues to act on the optical wave plate assembly 12, the image sensor 22 outputs a pattern image of bright and dark distribution. The micro-processing module 24 receives signals about the pattern image of bright and dark distribution, wherein the bright and dark distribution pattern image is related to the code pattern. The micro-processing module 24 analyzes the signal about the distribution of the change in brightness of the code pattern and performs a decoding process to obtain the coordinate information of the reading device 14, thereby obtaining the coordinate change of the route when the reading device 14 clicks or writes on the optical wave plate assembly 12 by a specific algorithm.

In an embodiment, the appearance of the reading device 14 preferably has a hold portion, for example, the reading device 14 is a pen type and has a contact end 141 for abutting or adjacent to the optical wave plate assembly 12. Thus, the user can interact with the optical wave plate assembly 12 in a customary writing action. In order to protect the optical wave plate assembly 12, a protective layer (not shown) may be coated on the optical wave plate assembly 12. The protective layer may have functions such as hardness, scratch resistance, and antifouling. In an embodiment, a protection cover (not shown) may also be disposed on the optical wave plate assembly 12.

Figure 3:
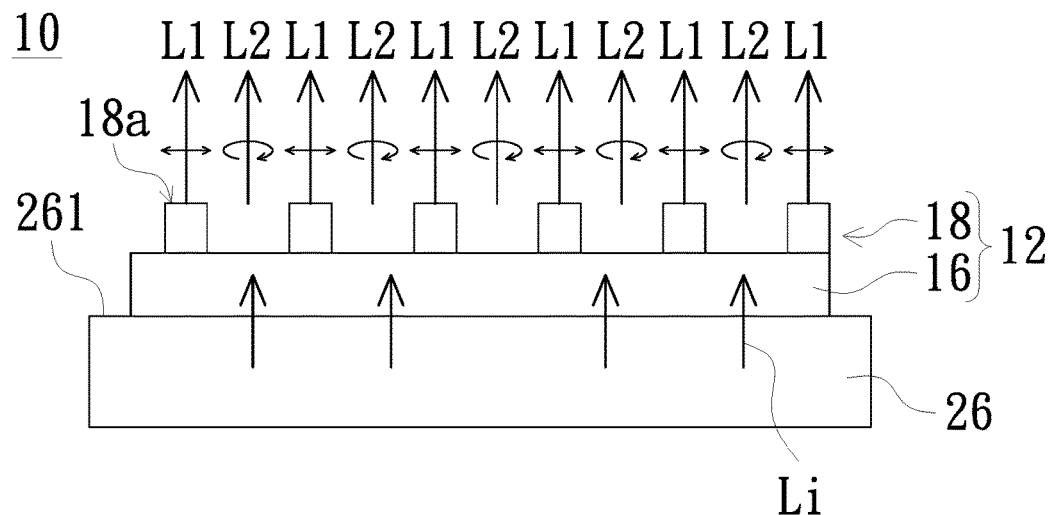
FIG. 3 is a schematic diagram of a user input system disposed on a display device according to an embodiment of the invention.

Following the above description, in an embodiment as shown in FIG. 3, the optical wave plate assembly 12 is attached, for example, to a display surface 261 of a display device 26. The light emitted by the display device 26 is used as the incident light L1 incident on the optical wave plate assembly 12. Since the phase retardation layer 18 has the code pattern 18a, the first polarized light L1 or the second polarized light L2 is emitted from different positions after the incident light L1 is converted by the optical wave plate assembly 12.

Figure 4:
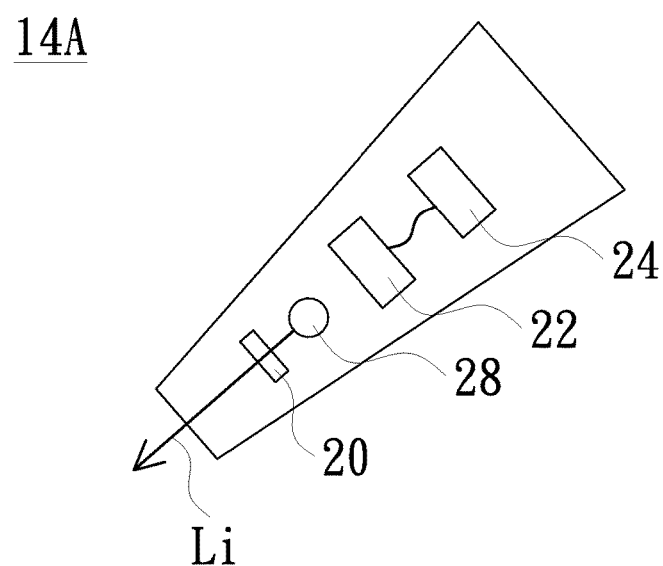
FIG. 4 is a schematic diagram of a reading device according to a second embodiment of the present invention.

In another embodiment as shown in FIG. 4, the reading device 14A further includes a light source module 28. The light source module 28 emits a light beam as the incident light L1 incident on the optical wave plate assembly 12. As the reading device 14A acts on the optical wave plate assembly 12, the incident light L1 emitted from the optical module 28 is converted into the first polarized light L1 or the second polarized light L2 according to the code pattern 18a, and the first polarized light L1 or the second polarized light L2 is then reflected back to the reading device 14A. The light source module 28 is disposed on a side of the polarized light selector 20. In an embodiment, the light beam emitted by the light source module 28 passes through the polarized light selector 20 to be converted into, for example, a light having the first polarization state and then enters the optical wave plate assembly 12 as the incident light L1.

In an embodiment, the phase wave plate 16 is selected from one of a half-wavelength wave plate and a quarter-wavelength wave plate, and the phase retardation layer 18 is selected from one of a half-phase retardation wave plate and a quarter-phase retardation wave plate. The optical wave plate assembly 12 can make the first polarization state and the second polarization state as a linear polarization and a circular polarization according to the combination of different phase wave plates 16 and different phase retardation layers 18. The linear polarization can be divided into P polarization and S polarization, and the circular polarization can be divided into left circular polarization and right circular polarization. The present invention is described by that the optical wave plate assembly 12 includes the phase wave plate 16 and the phase retardation layer 18, however, it can be understood that the phase wave plate is also a phase retardation layer. Therefore, in other embodiments, the optical wave plate assembly 12 may include a plurality of phase retardation layers, and one of the phase retardation layers has an encoded pattern.

Figure 5A:
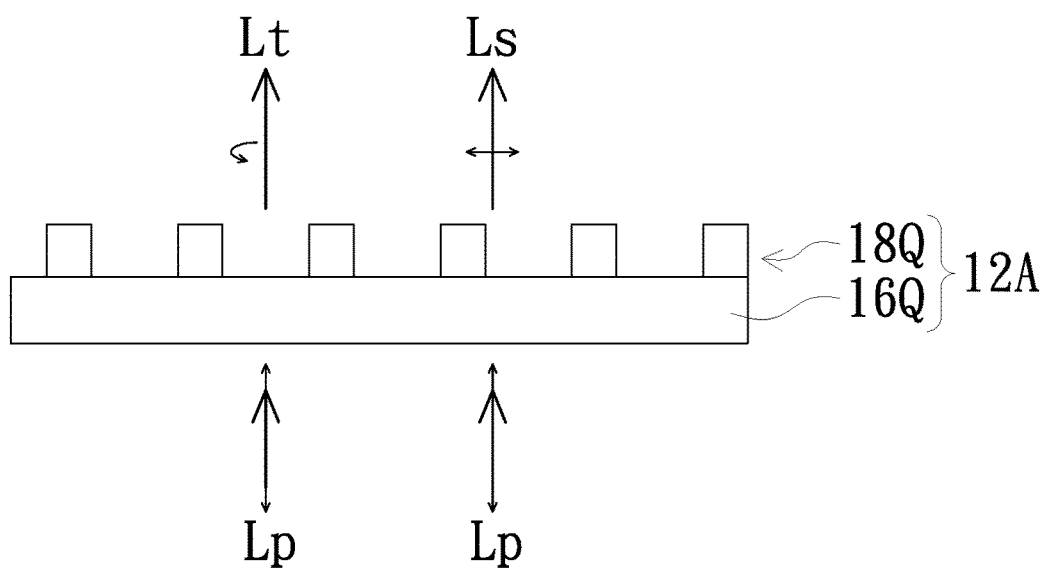
FIGS. 5a and 5b are schematic diagrams showing incident light of different polarization state entering an optical wave plate assembly according to a first embodiment of the present invention, respectively.
Figure 5B:
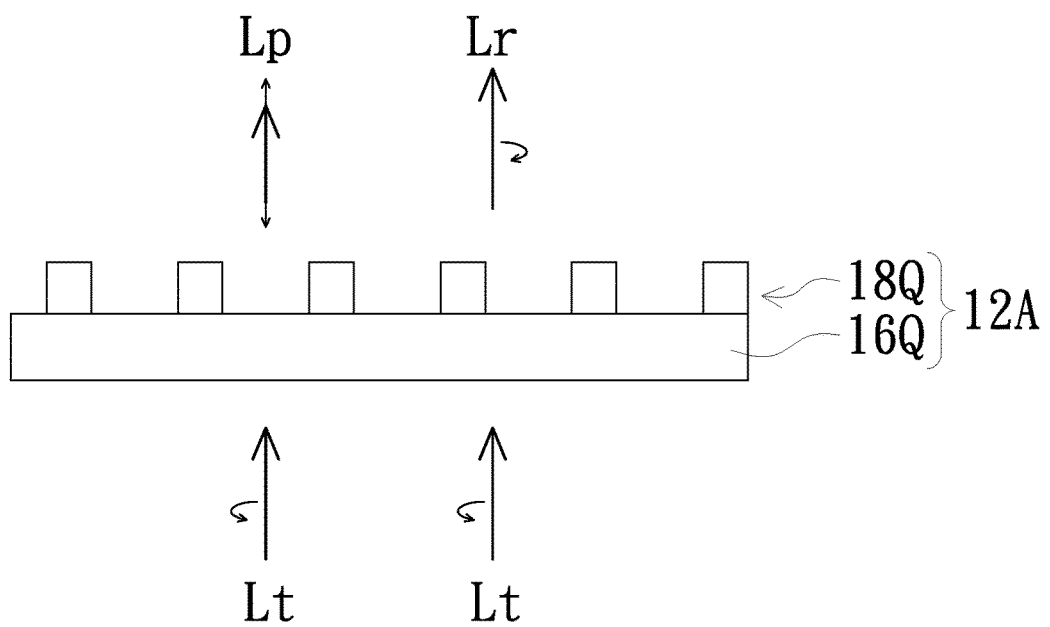

FIGS. 5a and 5b are schematic diagrams showing incident light of different polarization state entering an optical wave plate assembly according to a first embodiment of the present invention, respectively. The optical wave plate assembly 12A includes a quarter-wavelength wave plate 16Q and a quarter-phase retardation wave plate 18Q. In FIG. 5a, a P-polarized light Lp is used as an incident light. When the P-polarized light Lp passes only the quarter-wavelength wave plate 16Q, the P-polarized light Lp is converted into left circular polarized light Lt or right circular polarized light Lr (FIG. 5a is exemplified by a left circular polarized light Lt, but not limited thereto). When the P-polarized light Lp passes through both of the quarter-wavelength wave plate 16Q and the quarter-phase retardation wave plate 18Q, the P-polarized light Lp is converted into S-polarized light Ls. In FIG. 5b, a left circular polarized light Lt is used as an incident light. When the left circular polarized light Lt passes only the quarter-wavelength wave plate 16Q, the left circular polarized light Lt is converted into P-polarized light Lp. When the left circular polarized light Lt passes through both of the quarter-wavelength wave plate 16Q and the quarter-phase retardation wave plate 18Q, the left circular polarized light Lt is converted into right circular polarized light Lr. The vibration directions of the electric field of the P-polarized light and the S-polarized light are perpendicular to each other. It can be understood that in another embodiment, the right circular polarized light Lr can be used as incident light, and therefore, the right circular polarized light Lr is converted into S-polarized light Ls after passing through the quarter-wavelength wave plate 16Q, and the right circular polarized light Lr is converted into left circular polarized light Lt after passing through both of the quarter-wavelength wave plate 16Q and the quarter-phase retardation wave plate 18Q.

Figure 6A:
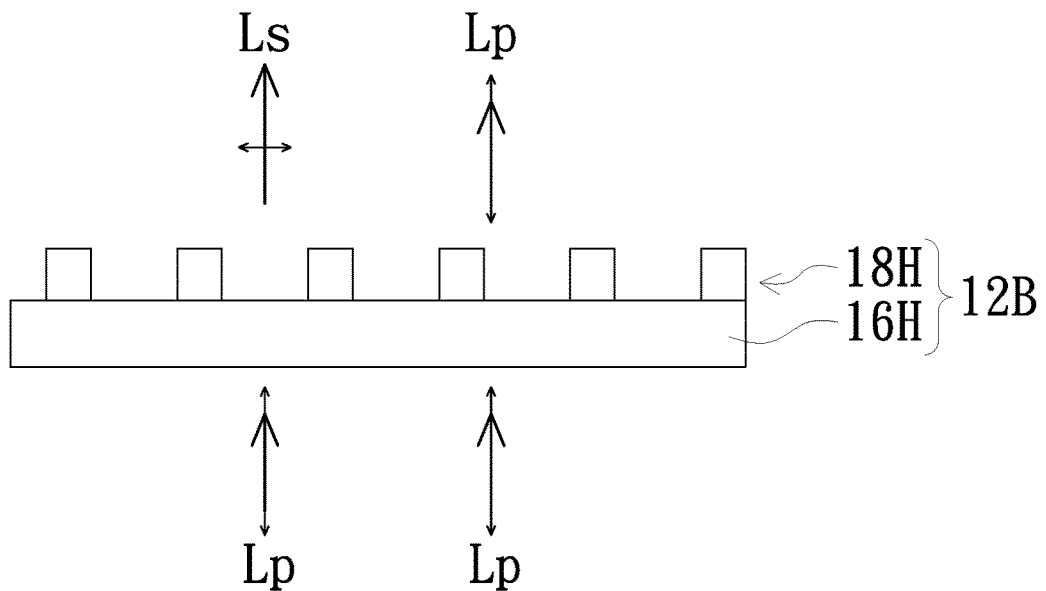
FIGS. 6a and 6b are schematic diagrams showing incident light of different polarization state entering an optical wave plate assembly according to a second embodiment of the present invention, respectively.
Figure 6B:
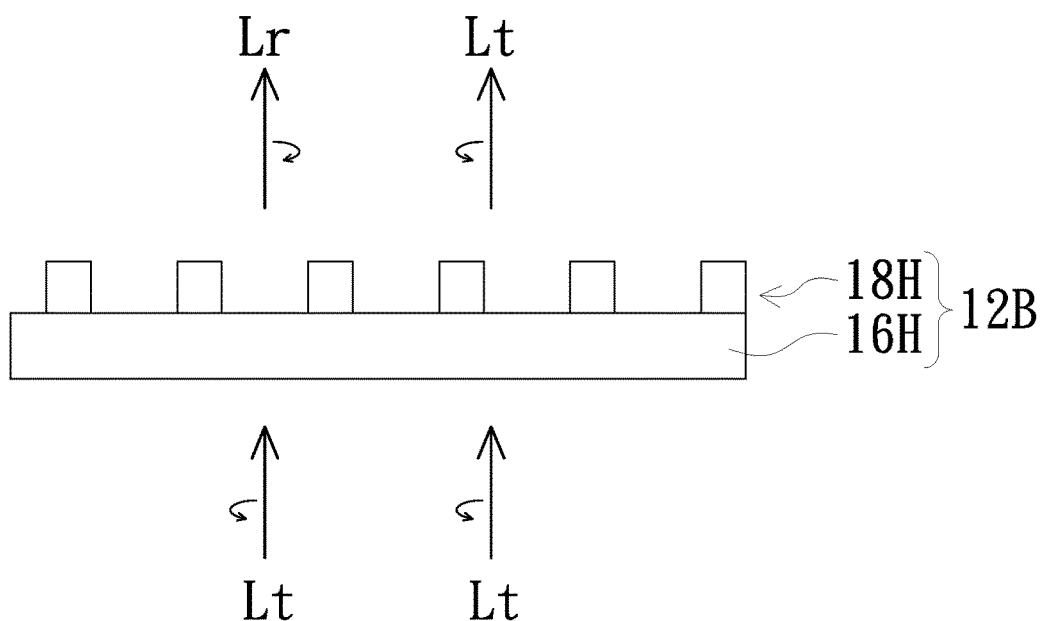

FIGS. 6a and 6b are schematic diagrams showing incident light of different polarization state entering an optical wave plate assembly according to a second embodiment of the present invention, respectively. The optical wave plate assembly 12B includes a half-wavelength wave plate 16H and a half-phase retardation wave plate 18H. In FIG. 6a, a P-polarized light Lp is used as an incident light. The P-polarized light Lp may be converted into S-polarized light Ls and P-polarized light Lp due to the configuration of the code pattern of the optical wave plate assembly 12B. In FIG. 6b, a left circular polarized light Lt is used as an incident light. The left circular polarized light Lt may be converted into right circular polarized light Lr and left circular polarized light Lt due to the configuration of the code pattern of the optical wave plate assembly 12B. In another embodiment, the right circular polarized light Lr may also be used as the incident light.

Figure 7A:
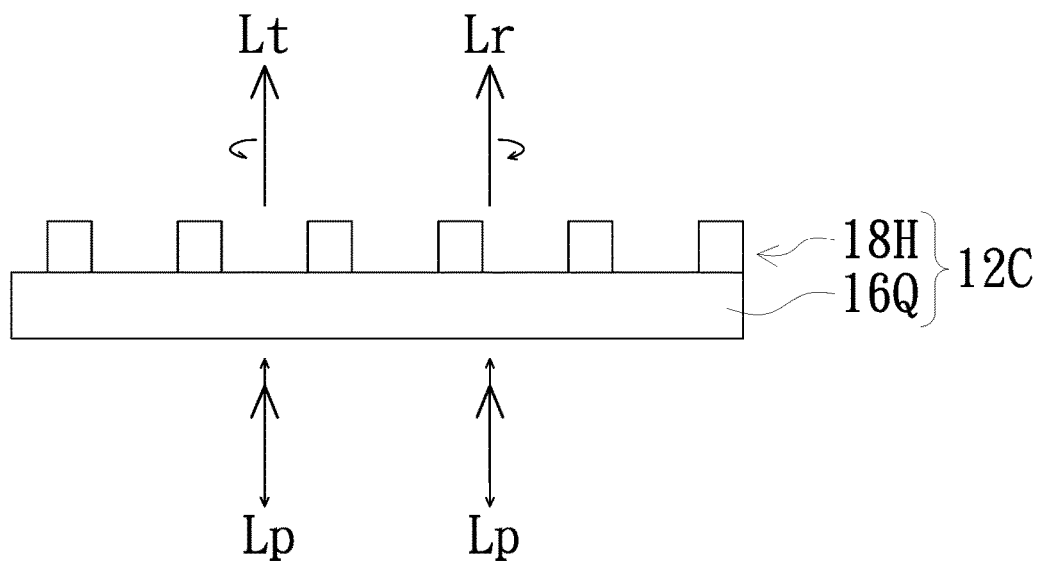
FIGS. 7a and 7b are schematic diagrams showing incident light of different polarization state entering an optical wave plate assembly according to a third embodiment of the present invention, respectively.
Figure 7B:
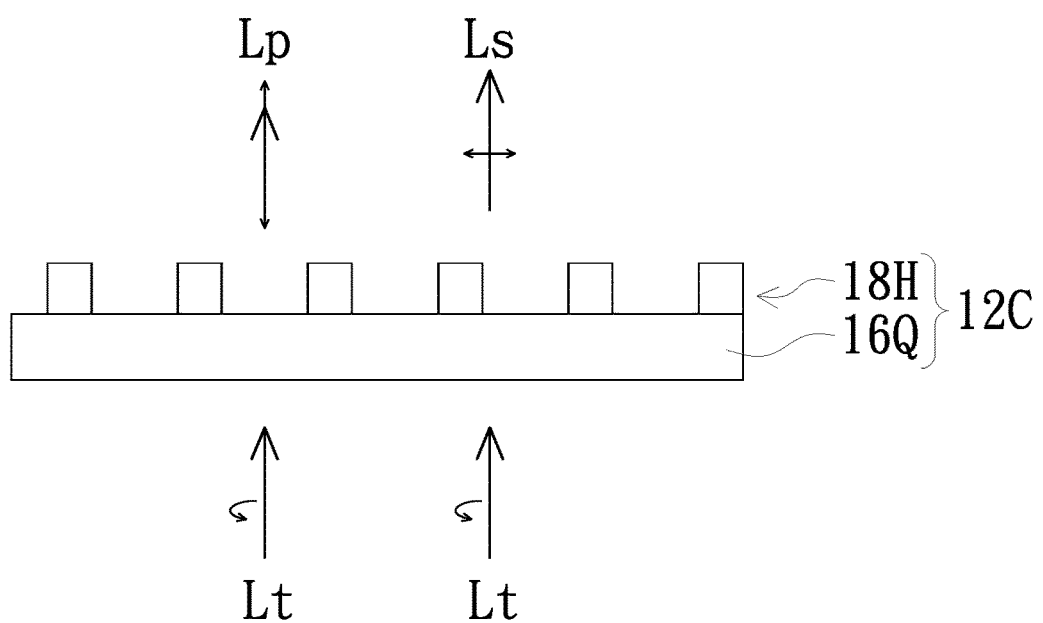

FIGS. 7a and 7b are schematic diagrams showing incident light of different polarization state entering an optical wave plate assembly according to a third embodiment of the present invention, respectively. The optical wave plate assembly 12C includes a quarter-wavelength wave plate 16Q and a half-phase retardation wave plate 18H. In FIG. 7a, a P-polarized light Lp is used as an incident light. The P-polarized light Lp may be converted into left circular polarized light Lt or right circular polarized light Lr due to the configuration of the code pattern of the optical wave plate assembly 12C. In FIG. 7b, a left circular polarized light Lt is used as an incident light. The left circular polarized light Lt may be converted into S-polarized light Ls and P-polarized light Lp due to the configuration of the code pattern of the optical wave plate assembly 12C. In another embodiment, the right circular polarized light Lr may also be used as the incident light.

From above, it can be seen that the light passing through or reflected by the optical wave plate assembly 12A/12B/12C has two different polarization states. As shown in FIGS. 1 and 2, the polarized light selector 20 of the reading device 14 can allow the polarized light of one of the polarization states to enter therein according to a presetting, and therefore the polarized light of one of the polarization states is then sensed by the image sensor 22. For example, the polarized light selector 20 may select one of P-polarized light, S-polarized light, left circular polarized light and right circular polarized light to pass through therein.

In an embodiment, the micro-processing module 24 of the reading device 14 includes a communication interface (not shown) for transmitting the coordinate information to an external electronic device (not shown). In an embodiment, the communication interface is a wireless communication module. It can be understood that when the reading device 14 is not connected to the external electronic device, the reading device 14 can store the obtained coordinate information in a built-in memory, and then transmit the stored coordinate information to the external electronic device when the reading device 14 is connected to the external electronic device. The reading device 14 further includes a pressure sensor (not shown) to sense a change in pressure caused by the contact end 141 of the reading device 14 contacting the protective layer or the protective cover on the optical wave plate assembly 12.

In the embodiment of the present invention, by performing coordinate pattern coding on the phase retardation layer, the light passing through or reflected by the optical wave plate assembly can be converted into a polarized light of two polarization states according to the phase retardation layer. The reading device selects and allows the light of one of the polarization states to enter therein, and therefore generating a bright and dark distribution pattern image with high contrast caused by the presence or absence of entered polarized light. As the reading device continues to input on the optical wave plate assembly, the code pattern of the bright and dark distribution pattern image is continuously decoded, thereby obtaining representative coordinate information changes, and obtaining the planar coordinate information required for performing electronic writing and touch operations. The user input system with the present invention only needs to utilize a light source to perform an interactive operation just as the conventional touch devices do.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A user input system, comprising:
    an optical wave plate assembly, comprising a phase wave plate and a phase retardation layer, wherein the phase retardation layer is disposed on at least one surface of the phase wave plate, the phase retardation layer comprises a code pattern, the code pattern comprises encoded information and coordinate information, the optical wave plate assembly converts an incident light into at least one of a first polarized light having a first polarization state and a second polarized light having a second polarization state through the phase retardation layer, wherein the first polarization state and the second polarization state are different; and
    a reading device, for acting on the optical wave plate assembly, sensing presence or absence of the first polarized light having the first polarization state, analyzing a distribution of a change in brightness of the code pattern, and performing a decoding to obtain the encoded information and coordinate information.

2. The user input system according to claim 1, wherein the first polarization state and the second polarization state are selected from one of vertical linear polarization, horizontal linear polarization, left circular polarization, and right circular polarization.

3. The user input system according to claim 1, wherein the reading device comprises:
    a polarized light selector, for allowing the first polarized light having the first polarization state to pass therethrough;
    an image sensor, for sensing presence or absence of the first polarized light to output at least one light distribution pattern image; and
    a micro-processing module, electrically connected to the image sensor, for analyzing the light distribution pattern image and performing a decoding to obtain the encoded information and coordinate information.

4. The user input system according to claim 3, wherein the first polarization state is selected from one of vertical linear polarization, horizontal linear polarization, left circular polarization, and right circular polarization.

5. The user input system according to claim 3, wherein the reading device further comprises a light source module disposed on one side of the polarized light selector, and the light source module emits a light beam as the incident light.

6. The user input system according to claim 5, wherein the light beam passes through the polarized light selector and is incident on the optical wave plate assembly as the incident light.

7. The user input system according to claim 1, wherein the optical wave plate assembly is disposed on a display surface of a display device, and a light emitted by the display device is used as the incident light.

8. The user input system according to claim 1, wherein the phase retardation layer comprises a plurality of hollow regions, and the coded pattern is formed by the hollowed regions or non-hollowed regions.

9. The user input system according to claim 1, wherein the code pattern comprises a plurality of pattern units, and a shape of the pattern unit is a single geometric pattern or a mixture of a plurality of geometric patterns.

10. The user input system according to claim 1, wherein the phase wave plate is selected from one of a half-wavelength wave plate and a quarter-wavelength wave plate, and the phase retardation layer is selected from one of a half phase retardation wave plate and a quarter phase retardation wave plate.

11. The user input system according to claim 1, wherein the incident light passes through the phase wave plate to become the first polarized light, and the incident light passes through the phase wave plate and the phase retardation layer to become the second polarized light.

12. The user input system according to claim 1, wherein the incident light passes through the phase wave plate and the phase retardation layer to become the first polarized light, and the incident light passes through the phase wave plate to become the second polarized light.

13. The user input system according to claim 1, further comprising a protective layer disposed on the optical wave plate assembly.

14. An optical wave plate assembly for use in a user input system, the optical wave plate assembly comprising:
    a phase wave plate; and
    a phase retardation layer, wherein the phase retardation layer is disposed on at least one surface of the phase wave plate, the phase retardation layer comprises a code pattern, the code pattern comprises encoded information and coordinate information, the optical wave plate assembly converts an incident light into at least one of a first polarized light having a first polarization state and a second polarized light having a second polarization state through the phase retardation layer, wherein the first polarization state and the second polarization state are different.

15. The optical wave plate assembly according to claim 14, wherein the first polarization state and the second polarization state are selected from one of vertical linear polarization, horizontal linear polarization, left circular polarization, and right circular polarization.

16. The optical wave plate assembly according to claim 14, wherein the phase retardation layer comprises a plurality of hollow regions, and the coded pattern is formed by the hollowed regions or non-hollowed regions.

17. The optical wave plate assembly according to claim 14, wherein the code pattern comprises a plurality of pattern units, and a shape of the pattern unit is a single geometric pattern or a mixture of a plurality of geometric patterns.

18. The optical wave plate assembly according to claim 14, wherein the phase wave plate is selected from one of a half-wavelength wave plate and a quarter-wavelength wave plate, and the phase retardation layer is selected from one of a half phase retardation wave plate and a quarter phase retardation wave plate.

* * * * *